March 21, 1939.  A. L. FREEDLANDER  2,151,096
PACKING
Filed Dec. 10, 1936  2 Sheets-Sheet 1
Fig.1.
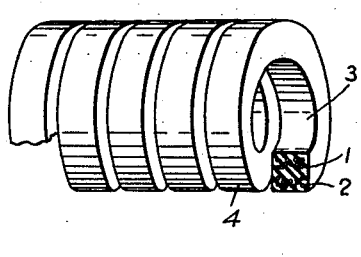
Fig.2.
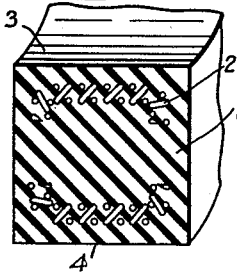
Fig.3.
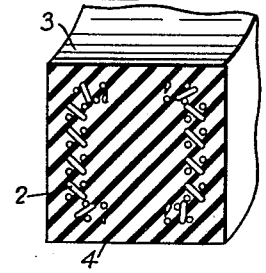
Fig.4.
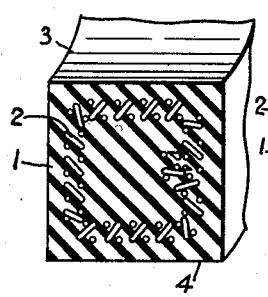
Fig.5.
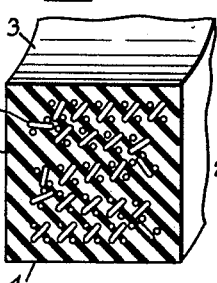
Fig.6.
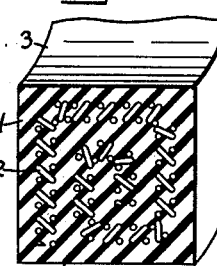
Fig.7.
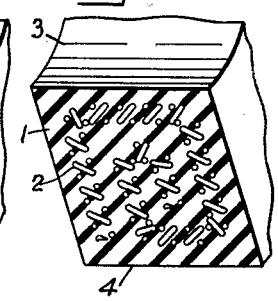
Fig.8.
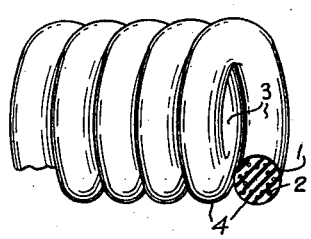
Fig.9.
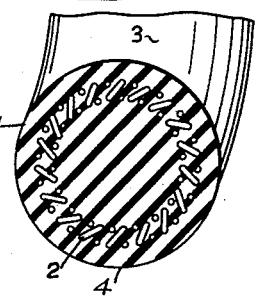
Fig.10.
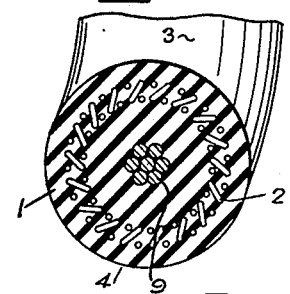
Fig.25.
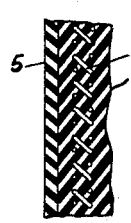
Fig.11.
Fig.12.
Fig.26.
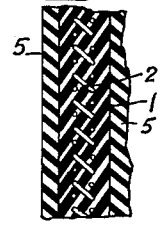
Fig.27.
Fig.28.
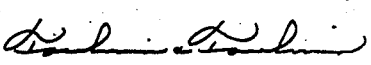
INVENTOR
ABRAHAM I. FREEDLANDER,
BY
ATTORNEYS March 21, 1939.  A. L. FREEDLANDER  2,151,096
PACKING
Filed Dec. 10, 1936  2 Sheets-Sheet 2
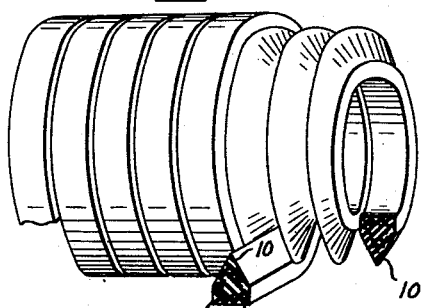
Fig.13
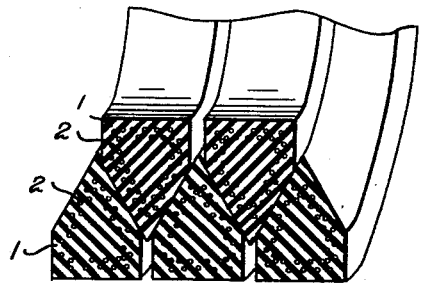
Fig.14
 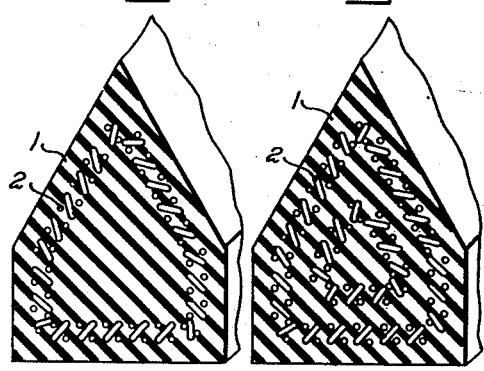 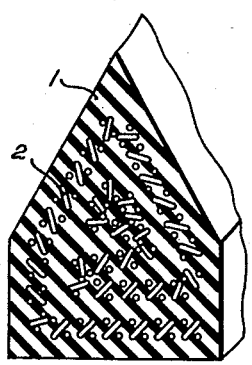 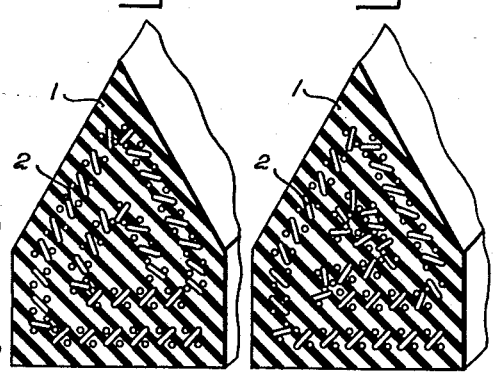
Fig.15  Fig.16  Fig.17  Fig.18
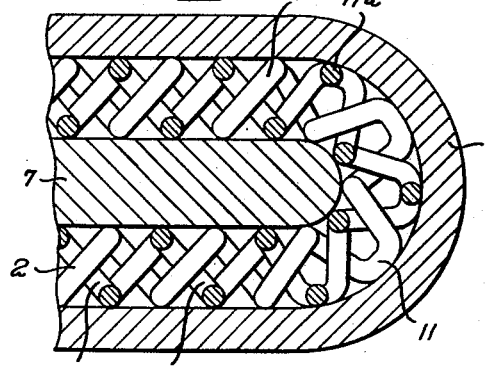
Fig.24
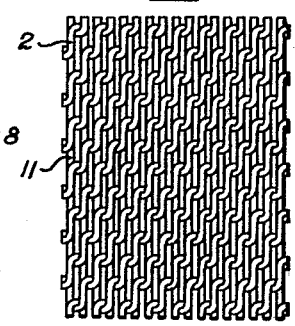
Fig.19
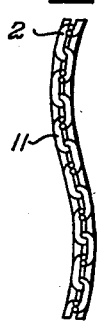
Fig.20
Fig.21
Fig.22
Fig.23
INVENTOR
ABRAHAM L. FREEDLANDER
BY
ATTORNEYS Patented Mar. 21, 1939

2,151,096

UNITED STATES PATENT OFFICE 2,151,096

PACKING

Abraham L. Freedlander, Dayton, Ohio, assignor to The Dayton Rubber Manufacturing Company, Dayton, Ohio, a corporation of Ohio Application December 10, 1936, Serial No. 115,195

1 Claim. (Cl. 288—1)

This invention relates to packing and particularly to resilient packing.

It is an object of this invention to provide a packing which is formed of extremely resilient material and particularly of rubber or synthetic rubber which is suitably reinforced to provide additional strength to the rubber without impairment of the resiliency thereof.

It is a further object of this invention to provide such a packing which is resistant to cold flow and/or permanent distortion under the application of continuous force.

It is a further object of this invention to provide a reinforcement for the body of the packing, through which reinforcement the material of the body of the packing extends to resiliently connect the portions of the packing body at opposite sides of the reinforcement.

It is a further object of this invention to provide packing material composed of rubber reinforced with longitudinally inextensible flexible metal mesh.

It is a further object of this invention to provide such packing material in which the body portion is formed of rubber reinforced with flexible metal mesh and provided with an oil resistant coating of synthetic rubber or other equivalent material.

It is a further object of this invention to provide a packing having imbedded therein flexible metal mesh reinforcement extending substantially continuously about its borders and spaced therefrom.

It is a further object of this invention to provide such a packing having the mesh reinforcement disposed adjacent and parallel to opposite surfaces thereof and extending through the core of the cross sectional area thereof in order to impart additional strength to the core portion of the packing.

Formerly, due to the vulnerability of rubber to the attack of oils, grease and the like, the desirable resiliency thereof was unavailable for the construction of packings subjected to contact with such substances.

Furthermore, due to the tendency toward cold flow of rubber under the force of continued compression, the mere protection of the outer surface of a rubber body would not solve the problem of making the use of rubber as a packing material possible.

Due to the existence of these problems which have heretofore been unsolved, it was necessary to construct packing members of such non-resilient material as rubber impregnated fabric.

By the utilization of the principles of my invention, I provide a reinforcement for a rubber body whereby to prevent cold flow, while at the same time preserving the original resiliency of the rubber. The reinforcement utilized by me comprises reinforcement material provided with apertures or interstices whereby, when imbedded in rubber, the rubber extends through the interstices from one side to the other of the reinforcement. This reinforcement material is sufficiently flexible to preserve the resiliency of the rubber while limiting the extensibility thereof axially due to the axial inextensibility of the reinforcement material beyond a predetermined point. This reinforcement material is preferably metallic and formed of a plurality of inter-engaged transverse sinuous strands of metal or wire which is freely flexible about transverse axes disposed parallel to the strands and which is flexible in the plane of the mesh as well as about axes extending lengthwise thereof.

Where it is desired, I provide the rubber body with a coating of synthetic rubber or equivalent oil resistant material having resiliency similar to that of rubber or I may form the body of the packing of synthetic rubber having imbedded therein a reinforcement of metallic mesh impregnated with rubber. I may likewise form the body of the packing of oil resistant rubber equivalent because, due to the extension of the material through the interstices of the mesh, the occurrence of cold flow will be avoided even though the bond between the synthetic rubber and the metallic mesh be imperfect. Where it is desired, the resilient body of rubber or its equivalent may be provided with a textile cover of known construction.

These and other objects and advantages will appear from the following description taken in connection with the drawings.

In the drawings:

Figure 1 is a view, in perspective, of one form of packing formed of resilient material of rectangular cross section reinforced according to the principles of my invention;

Figure 2 is an enlarged sectional view of the packing illustrated in Figure 1;

Figure 3 is a view similar to Figure 2, but illustrating a different disposition of the reinforcement in the resilient body of the packing;

Figure 4 is a view similar to Figure 2, but showing a second alternate disposition of the reinforcement in the resilient body;

Figure 5 is a view similar to Figure 2, but showing a third disposition of the reinforcement in the resilient body;

Figure 6 is a view similar to Figure 2, but showing a fourth disposition of the reinforcement in the resilient body;

Figure 7 is a view similar to Figure 6, but showing the application of the principles of my invention to a resilient body having a cross sectional area substantially in the form of a parallelogram, the arrangement of the reinforcement therein being similar to that illustrated in Figure 6;

Figure 8 is a view, in perspective, of a reinforced resilient packing of substantially circular cross section;

Figure 9 is a sectional view of the packing shown in Figure 8;

Figure 10 is a view similar to Figure 1, but showing the reinforcement applied, as shown in Figure 9, to a resilient body having a central reinforcing cable therein;

Figure 11 is a view similar to Figure 9, but showing the use of a plurality of concentrically arranged tubular reinforcements;

Figure 12 is a view similar to Figure 11, but showing the reinforcement disposed spirally with respect to the cross sectional area of the resilient body of the packing;

Figure 13 is a view, in perspective, of a packing construction formed of a pair of inter-wound helical packing members having cooperating inter-engaged oppositely disposed triangular sections, the body portion being formed of resilient material reinforced according to the principles of my invention;

Figure 14 is an enlarged sectional view of the structure shown in Figure 13;

Figure 15 is an enlarged sectional view of one of the members illustrated in Figure 14, showing one arrangement of the reinforcement in the resilient body of the packing;

Figure 16 is a view similar to Figure 15, but showing a concentric arrangement of reinforcement layers in the resilient body of the packing;

Figure 17 is a view similar to Figure 15, but showing a second arrangement of the reinforcement with respect to the resilient body of the packing;

Figure 18 is a view similar to Figure 15, but showing a third arrangement of the reinforcement with respect to the resilient body of the packing;

Figure 19 is a plan view of a portion of a preferred form of flexible metal mesh used in the practice of the principles of my invention;

Figure 20 is a side elevational view of the flexible mesh shown in Figure 19, illustrating the flexibility of the mesh about transverse axes;

Figure 21 is an end elevational view of the mesh shown in Figure 19;

Figure 22 is a view of one of the transverse sinuous metal strands used in the construction of the mesh shown in Figure 19;

Figure 23 is a view illustrating the cooperation of adjacent metal strands, as shown in Figure 22, in the mesh shown in Figure 19;

Figure 24 is a view illustrating the permanent deformation of the mesh with respect to axes extending longitudinally thereof;

Figure 25 is a fragmentary view illustrative of the application of an oil resistant coating to a mesh reinforced rubber packing body;

Figure 26 is a view similar to Figure 25, but illustrating the impregnation of flexible metal mesh with rubber and the incorporation of the rubber impregnated mesh into a packing body of synthetic rubber;

Figure 27 is a similar view, but illustrating a structure wherein the flexible metal mesh is disposed between the rubber packing body and its synthetic rubber coating and extending into each material; and Figure 28 is a view illustrating the application of a textile wrapper or cover to a packing body reinforced according to the principles of my invention.

The reinforcing of resilient bodies of rubber and/or synthetic rubber was heretofore sought to be accomplished by the incorporation therein of somewhat flexible reinforcing members of fabric, metal and other materials having continuous surfaces unprovided with interstices or apertures capable of permitting the extension therethrough of sufficient rubber resiliently to connect together the portions of the resilient body at opposite sides of the reinforcement. The resiliency of the body was substantially impaired by the incorporation therein of the reinforcement.

While, in some cases, the reinforcing material was possessed of sufficient flexibility for the purpose, it so effectively separated or insulated the portions of the resilient body as to impart to the body the properties of two separate resilient bodies rigidly connected together or each connected to the opposite side of a member through which the resilient waves from one body could not pass to the other body.

Where the bond between the portions of the resilient body and the connecting reinforcing material was imperfect, destruction of the bond speedily followed application of force to the body, especially when the force was applied intermittently over a period of time. This objectionable condition was most often encountered in the reinforcement of synthetic rubber due to the difficulty of securing perfect bonding thereof to reinforcing materials in general, and in particular to metallic reinforcing materials. In other cases, the continuous application of force caused the occurrence of objectionable and destructive cold flow. This latter condition resulted even where the adhesion between the reinforcement and the surrounding resilient body was perfect.

Accordingly, due to the fact that packing members are subjected to substantially continuous compression, I have provided a reinforcement in a packing body of rubber, synthetic rubber or a body of rubber coated with synthetic rubber for a purpose explained above, which reinforcement is flexible though inextensible beyond a predetermined degree in one direction. The metallic mesh is provided with interstices, through which, when the mesh is imbedded in rubber, the rubber extends from one side of the mesh to the other to resiliently join the rubber at opposite sides of the mesh and by means of which the resilient waves transmitting to one portion of the rubber by application of force thereto will be transmitted, through the reinforcing mesh, to the rubber at the opposite side of the mesh. The application of this mesh greatly strengthens the surface portions of the rubber body against cold flow and, because of the flexibility of the mesh, the resiliency of the rubber body is preserved without cutting action thereon by the mesh due to its flexibility.

By reinforcing the resilient body of the packing by the incorporation therein of flexible mesh provided with interstices or apertures capable of permitting the extension therethrough of sufficient resilient body material from one side of the mesh to the other side thereof, I achieve satisfactory reinforcement of the resilient body material against cold flow under compression without impairment of the resiliency thereof, even where the bond between the resilient body material and the reinforcement is imperfect. Likewise, the longitudinal inextensibility of the flexible mesh imparts additional strength in tension without impairing the flexibility of the resilient body material.

Referring to the drawings in detail, I have illustrated in Figures 1 to 6 inclusive, the reinforcement of a packing body 1 of rubber by means of flexible metal mesh 2. The longitudinal axis of the metal mesh extends parallel to the longitudinal axis of the rubber body 1. The rubber body 1 is substantially rectangular in cross section, and in Figure 1 the reinforcement comprises two strips of metal mesh 2 disposed substantially parallel to the inner surface 3 and to the outer surface 4 respectively of the rubber body 1. The edges of the strips of metal mesh are bent at substantially ninety degrees with respect to the main portion of the strip in order that the four corner edges of the body 1 will be provided with sufficient reinforcement. This form of packing is particularly adapted for use on elevator plungers, steam hammer pistons or the like.

In order to adapt the packing of Figures 1 and 2 and for use in relations where the body 1 will encounter gases, liquids or other materials, to the attack of which rubber is vulnerable, the surface of the rubber body 1 may be provided with a coating of synthetic rubber 5, as illustrated in Figures 25 and 27, or the mesh 2 may be impregnated in rubber 1 and the impregnated mesh incorporated in a body of synthetic rubber 5, as illustrated in Figure 26. Likewise, the body 1 may be constructed entirely of synthetic rubber instead of rubber. Where it is desired, a fabricated cover 6 of textile material, woven asbestos fiber, or the like, may be provided in order to provide the coefficient of friction between the packing and associated parts (Figure 28), and the cover may be graphited in known manner, if desired.

As illustrated in Figure 3, the strips of mesh 2 are disposed parallel to the upper and lower side edges of the body 1 in order to effectively prevent cold flow at the respective corners and particularly at the top and bottom sides of the body 1, as is particularly desirable where either one or both of these sides encounters a joint between connected metallic members.

Figure 4 illustrates the continuation of the metal mesh 2 entirely around a closed path similar to the outline of the cross section of the body 1, the sides of the metal mesh which is thus formed into a tube being parallel to the respective sides of the body 1. In Figure 3, the metal mesh is illustrated as extending parallel to the inner side 3 and the outer side 4 and being bent over upon itself a plurality of times in order to provide substantial reinforcement to the central portion of the body 1 against stresses similar to those encountered by the embodiment of Figure 2, but of greater magnitude. Figure 6 illustrates an embodiment in which the mesh is disposed substantially parallel to and coextensive with the sides of the body 1 and extending inwardly to form a strongly reinforced central core portion.

Although the mesh 2 is flexible in the plane thereof and freely flexible about transverse axes thereof, as illustrated in Figure 20, it is not flexible about axes extending lengthwise thereof, because of the use of the continuous strands therein, as illustrated in Figure 22. Therefore, in order to provide for the longitudinally disposed bends therein, the mesh 2, as illustrated in Figure 24, is disposed between an inner die member 7 and an outer die member 8 of complementary form and, upon the application of pressure to the inner die member 7, as seen in Figure 24, the mesh 2 is provided with the desired longitudinally extending bends.

The form illustrated in Figure 7 is similar to that illustrated in Figure 6, save that the body 1 is formed in the shape of a parallelogram instead of a rectangle. In the form illustrated in Figure 7, the mesh is disposed similarly to its disposition with respect to the inner, outer, top and bottom walls of the body 1, and the body 1 may be formed of rubber, of rubber having an external coating of synthetic rubber, entirely of synthetic rubber with the mesh 2 directly imbedded therein or of synthetic rubber having the mesh 2 imbedded in rubber and incorporated therein as illustrated in Figure 26.

In the form illustrated in Figures 8 and 9, the rubber body 1 is of substantially circular cross section, although, of course, it may be of elliptical form. As shown therein, the mesh 2 is formed as a continuous tube and disposed concentrically of the circular cross section of the body 1. The substantially cylindrical surface portion of the body member 1 is thus reinforced against cold flow upon the continued application of compressive force thereto. The body member 1 may, of course, be formed of synthetic rubber material and have the mesh 2 directly incorporated therein, or the body portion may be made of synthetic rubber and have latex impregnated mesh incorporated therein or the body portion may be made of rubber and reinforced by the mesh and provided with a coating of synthetic rubber, as illustrated in Figures 25 and 27. Any of these constructions may be provided with a textile or woven asbestos fiber cover, as illustrated in Figure 28; and the cover may, if desired, be graphited in a manner which is well known in the art. The structure illustrated in Figure 10 is provided with a centrally disposed cable 9 for reinforcing purposes and is otherwise similar to the structure illustrated in Figure 9.

In the structure illustrated in Figure 11, the body portion 1 of the packing is reinforced by a plurality of concentric tubular members of mesh 2. The structure illustrated in Figure 11 is otherwise similar to that illustrated in Figure 9.

In the form of packing illustrated in Figure 12, the body 1 is provided with reinforcement comprising a strip of spirally wound mesh 2. The form of packing illustrated in Figure 12 is otherwise similar to that illustrated in Figure 9 and in Figure 11, in which latter figure the use of mesh to reinforce the central portion of the body 1 is also illustrated.

In the form of packing illustrated in Figures 13 to 18 inclusive, a pair of reversely inter-wound helical members form a packing wherein the resiliency of the body portion 1 is exerted both radially, inwardly and outwardly and also axially of the packing assembly. The body portion 1 is provided with an engaging portion 10 of triangular cross section which is adapted to be inter-engaged, upon winding, with similar portions of the inter-wound member, as illustrated in Figure 14. In order that cold flow be prevented in such a packing, the mesh 2 is disposed substantially parallel to each of the walls of the body 1 and, as illustrated in Figures 13, 14 and 15, a continuous mesh member is used, which may be formed by bending a mesh tube into the cross sectional form desired.

As illustrated in Figure 16, a plurality of such mesh forms may be concentrically disposed within the body portion 1 or, as illustrated in Figure 17, the mesh reinforcement may be formed by bending a strip of mesh 2 into spiral form in which the outer surfaces are disposed substantially parallel with the walls of the body 1. Also, as illustrated in Figure 18, the outer portions of the reinforcing mesh member may be spirally wound, while the centrally disposed portion may be bent over upon itself in order to secure utmost reinforcement in the central portion of the body member 1. As is the case with the forms of packing illustrated in Figures 1 to 12 inclusive, the body member 1 may be formed of rubber, of synthetic rubber having the reinforcement member of mesh 2 incorporated directly therein, or of synthetic rubber having rubber impregnated mesh incorporated therein, as illustrated in Figure 26.

Likewise, the body portion may be formed of rubber having the mesh reinforcement incorporated therein and the body portion provided with a coating of synthetic rubber, as illustrated in Figures 25 and 26, and the forms illustrated in Figures 13 to 18 inclusive may be provided, if desired, with a cover 6 of fabricated textile or woven asbestos fiber which may, if preferred, be graphited.

A form of mesh which is preferred in the utilization of the principles of my invention is illustrated in detail in Figures 19 to 24 inclusive, and with reference to those figures it will be seen that the mesh is composed of a plurality of transverse sinuous strands 11 pivotally inter-engaged, as illustrated in Figure 23. The respective adjacent strands 11 are thus pivotally engaged with one another and may move toward one another, although their movement away from one another is limited, as shown in Figure 23. The mesh is, therefore, longitudinally inextensible. However, due to the fact that the engaging surfaces of adjacent strands 11 are arcuate, the mesh is flexible in its own plane as well as freely flexible (Figure 20) about transverse axes which are parallel to the strands 11 and to the pivotal axes between the respective adjacent strands.

As will be seen from the showing of Figures 21 and 24, the mesh is substantially rigid with respect to longitudinal axes and thus, in order to provide the bends required in the formation of the mesh into the shapes illustrated in Figures 1 to 18 inclusive, the respective strands 11 must be provided with such bent portions. For clearness of illustration, the respective adjacent strands in Figures 21, 23 and 24 are designated 11 and 11a. It is, of course, to be understood that, by the use of inner and outer die members 7 and 8 of desired form, the cross sectional shape of the mesh reinforcing members may be varied as desired.

The flexibility of the illustrated metal mesh allows it to be handled very easily. In manufacturing, it is possible to convey the mesh through a solution and latex it or impregnate it with a suitable cement in order to facilitate incorporation thereof with rubber equivalents which are relatively non-adherent to metal. This practice is contemplated where it is necessary to provide a bond between the metal of the mesh and non-adherent rubber equivalents, where such practice is necessary to bond the metal of the mesh to the rubber equivalent.

Where "Glyptal" resins are used, their easy flowing properties will permit them to flow through the mesh and provide the desired adhesion. These resins are resins of alkyd type and particularly synthetic resins of the glycerol phthalate type, the term "Glyptals" being commonly used in the art to describe resins of this class. It is essential in the practice of the principles of my invention that reinforcing members used be provided with suitable interstices to permit of the extension of the body material therethrough in order to provide resilient connection between the portions of the body material at opposite sides of the reinforcement. By the use of the term "mesh", I comprehend any associated metallic reinforcements, such as wires and foraminous plates and materials other than metal having these properties.

In the formation of moulded rubber articles, the mesh, which may be impregnated if desired, may be suspended within the mould and the rubber or rubber equivalent placed into the mould and vulcanized into finished form with the metal mesh incorporated therein. If desired, the textile or woven asbestos covering may be applied, either before or after vulcanization of the reinforced resilient packing body. As pointed out above, where such covers are used, graphite may be applied thereto in a manner which is well known.

While the description and the accompanying illustration relate to the use of articulated metal mesh in sheet form or in tubular form bent into desired shape, it is, of course, to be understood that other forms may be used when desired, it being possible to form the mesh into the shape of geometric forms other than cylinders.

It will, of course, be understood that the above description is merely illustrative of the manner in which the principles of my invention may be utilized and that I desire to comprehend within my invention such modifications as come within the scope of the claim and the invention.

Having thus fully described my invention, what I claim as new and desire to secure by Letters Patent is:

Resilient strip packing material reinforced against cold flow comprising a rubber body of geometric section having incorporated therein a reinforcement of flexible metal mesh, said mesh being relatively inextensible in one direction and freely extensible in a direction normal thereto, and shaped to substantially conform to the outline of the body, but spaced inwardly from the surface thereof, said reinforcement being so disposed as to resist cold flow in a direction longitudinal of the strip.

ABRAHAM L. FREEDLANDER.